(12) United States Patent
Alekperov et al.

(10) Patent No.: US 6,218,754 B1
(45) Date of Patent: Apr. 17, 2001

(54) ELECTRIC MOTOR OF A SUBMERSIBLE PUMP

(75) Inventors: Vagit Jusufovich Alekperov; Ravil Ulfatovich Maganov; Veniamin Filippovich Ovchinnikov; Vitaly Fedorovich Lesnichy; Alexandr Vasilievich Bezzubov; Valery Isaakovich Graifer; Vladimir Ivanovich Pavlenko; Vladimir Iosifovich Sagalovsky; Oleg Grigorievich Klochkov, all of Moscow (RU)

(73) Assignees: Otkrytoe Aktsionernoe Obschestvo Neftyanaya Kompania "Lukoil"; Obschestvo & Ogranichennoi Otvetstvennostju, both of Moscow (RU)

( * ) Notice: Subject to any disclaimer, the term of this patent is extended or adjusted under 35 U.S.C. 154(b) by 0 days.

(21) Appl. No.: 09/402,080

(22) PCT Filed: Jan. 27, 1999

(86) PCT No.: PCT/RU99/00026

§ 371 Date: Sep. 29, 1999

§ 102(e) Date: Sep. 29, 1999

(87) PCT Pub. No.: WO99/39422

PCT Pub. Date: Aug. 5, 1999

(30) Foreign Application Priority Data

Jan. 30, 1998 (RU) .................................. 98101537

(51) Int. Cl.[7] ................ H02K 1/00; H02K 3/04
(52) U.S. Cl. ................. 310/179; 310/201; 310/208
(58) Field of Search ................. 310/179, 180, 310/184, 195, 198, 201, 202, 203, 204, 205, 206, 207, 208, 214, 216, 254

(56) References Cited

U.S. PATENT DOCUMENTS

| | | | |
|---|---|---|---|
| 1,799,021 | * | 3/1931 | Parsons et al. ................. 310/201 |
| 2,085,099 | * | 6/1937 | Jones ................................. 310/201 |
| 2,333,575 | * | 11/1943 | Kilgore et al. ................... 310/201 |
| 3,590,301 | * | 6/1971 | Woydt ............................... 310/269 |
| 3,979,618 | * | 9/1976 | Auinger ............................ 310/198 |
| 4,350,911 | | 9/1982 | Wilson et al. ..................... 310/87 |

FOREIGN PATENT DOCUMENTS

| | | |
|---|---|---|
| 679173 A5 | 12/1991 | (CH) . |
| 42 34 129 C2 | 5/1994 | (DE) . |
| 1070344 | 6/1967 | (GB) . |
| 2 140 629 | 11/1984 | (GB) . |
| 2030058 | 2/1995 | (RU) . |
| 2083047 | 6/1997 | (RU) . |
| 1046847 | 10/1983 | (SU) . |

OTHER PUBLICATIONS

Bukhalenko, E.I. Ed. *Oil–Field Equipment*, Manual, 2$^{nd}$ edition, Moscow, "Nedra" 1990.

* cited by examiner

*Primary Examiner*—Nestor Ramirez
*Assistant Examiner*—Dang Dinh Le
(74) *Attorney, Agent, or Firm*—Nath & Associates, PLLC; Gary M. Nath; Harold L. Novick

(57) ABSTRACT

An electric motor of a submersible pump includes a body (1) with a core (2) of a stator arranged therein, in slots (9) of a tooth zone (8) of which multiturn sections of a two-layer winding are disposed with face parts, and a rotor (5). The core (2) of the stator comprises two parts (6, 7), an inner part with slots (9) open to the side of the periphery of the part (6), and an outer part (7) that is an annular yoke. Each section of the stator winding has a substantially square cross section and is formed by turns (12) of wire of substantially rectangular cross section, the turns lying adjacent each other along their large surfaces, wherein a first and a second side of each section are positioned in different layers (13, 14) of the two-layer winding so that in each slot (9) the large surfaces of the turns (12) in the layers (13, 14) of the winding are oriented mutually perpendicular, and the height of the face parts does not exceed the height of the slot (9).

The electric motor serves mainly for use in submersed pump units for submersed wells.

3 Claims, 1 Drawing Sheet

ELECTRIC MOTOR OF A SUBMERSIBLE PUMP

FIELD OF THE INVENTION

The invention relates to the field of electrical engineering, and more exactly, to electric motors of a submersible pump with a large length-to-diameter ratio.

BACKGROUND OF THE INVENTION

During the development of wells, in particular oil wells, submersible pump units are used which are equipped with a drive, the dimensions of which should not exceed the diameter of the well. The electric motors usually used as power drives of submerged units, taking this requirement into account, have a large length-to-diameter ratio.

An electric motor is known which comprises a body, with a laminated stator core arranged therein, in the slots of the tooth zone of which multiturn sections of a two-layer winding are disposed with face parts and a rotor spaced from the stator. In that construction the sections of the two-layer winding are disposed in slots open from the side of the face, wherein the sections may be formed by turns of wire that has a round or rectangular cross section depending on the power of the machine (V. V. Dombrovsky, G. M. Khutoretsky, "Basics of Designing Alternating Current Motors," Leningrad, Energiya, 1974, p. 349, FIGS. 8–29).

However, when there is a large ratio of the length of the electric motor to the diameter (L/d≧10), it is impossible in practice to make a winding of sections laid into slots from the side of the gap.

A submersible electric motor for a pump is also known, which includes a body, with a laminated stator core arranged therein, in the slots of the tooth zone of which multiturn sections of a two-layer winding are disposed with face parts, and a rotor spaced from the stator (prospectus of the "Konnas" firm—Submersible electric motors).

This motor has a large length-to-diameter ratio, which excludes the arrangement of a two-layer winding with preliminary formed multiturn sections in the slots of the tooth zone of a laminated core. In such a motor the sections of the winding are made of round wire by the method of broaching through slots. However, when wire with a round cross section is used the filling factor of the winding in the slot is small (the ratio of the cross section of copper to the cross section of the slot), which is accompanied by an increase of the weight and size of the motor, a relatively large thickness of the layer of impregnation compound is required, which increases the thermal resistance for losses in the copper and makes the release of heat into the environment more difficult.

The method of assembling a motor by broaching wire through a slot, including forming sections of the winding directly in the slot, results in the necessity for rewinding in the case of insufficient electrical strength or damage to the insulation, and also makes the step of laying slot insulation more difficult.

SUMMARY OF THE INVENTION

The object at the base of the invention is to create an electric motor for a submersible pump, the construction of which would make it possible, with a large ratio of the length of the motor to its diameter, to preliminarily form sections of a two-layer winding of the stator and to arrangement it in the slots of the tooth zone of the core as already formed sections, which would make it possible to enhance the filling factor of a slot and, consequently, reduce the size and weight of the electric motor, and also to increase the productivity of submersible pumps with an electric drive in small diameter wells.

The stated object is achieved in an electric motor of a submersible pump, which includes a body, with a laminated stator core arranged therein, in the slots of the tooth zone of which multiturn sections of a two-layer winding are disposed with face parts, and a rotor spaced from the stator, in that in accordance with the invention, the stator core comprises two parts, an inner part including a tooth zone with slots open to the side of the periphery of that part, and an outer part encompassing the inner and being an annular yoke, each section of the stator winding has a substantially square cross section and is formed by turns of wire of substantially rectangular cross section, the turns lying adjacent each other along their large surfaces, wherein a first and second side of each section are positioned in different layers of the two-layer winding so that in each slot the large surfaces of the turns in the first and second layers of the winding are oriented mutually perpendicular, and the height of the face parts does not exceed the height of the slot.

The concept "substantially square cross section" within the limits of this invention is considered as a cross section selected taking the following relationship into account:

$$h=(0.9-1.1)b,$$

wherein h is the height of the cross section of the section, b is the width of the cross section of the section.

The concept "substantially rectangular cross section" assumes any cross section, the length of two opposite sides of which exceeds the length of the two other opposite sides of that cross section.

BRIEF DESCRIPTION OF THE DRAWINGS

Further the invention will be explained by a description of concrete variants of its fulfillment together with the appended drawings, in which.

DETAILED DESCRIPTION OF THE INVENTION

Figure 1:
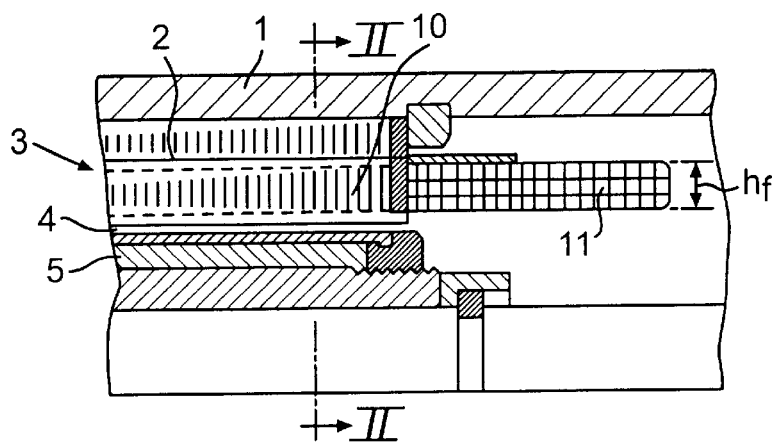
FIG. 1 shows an electric motor of a submersible pump, in accordance with the invention, a partial longitudinal section.
Figure 2:
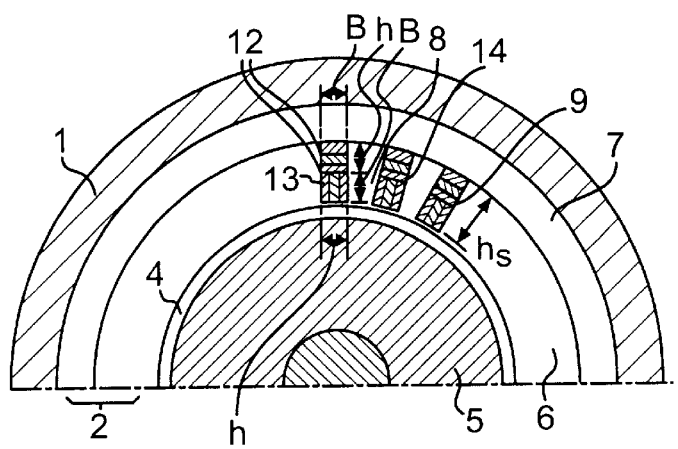
FIG. 2 shows a section along line II—II in FIG. 1.
Figure 3:
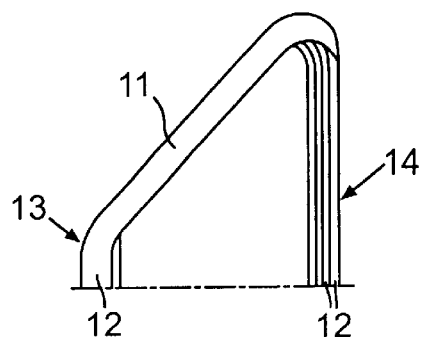
FIG. 3 shows the face part of the section, isometric view.

An electric motor of a submersible pump includes a cylindrical body 1 with a laminated core 2 of a stator 3 mounted in the body and a rotor 5 separated from the stator 3 by a gap 4. The core 2 comprises two parts 6 and 7, of which an inner part 6 includes a tooth zone 8 with slots 9 that are open towards the periphery of that part and an outer part 7 is an annular yoke encompassing the inner part 6. Multiturn sections of a two-layer winding 10 with face parts 11 are placed in the slots 9 of the tooth zone 8. Each section of the winding of the stator has a substantially square cross section, which is selected so as to fulfill the relationship h=(0.9–1.1) b, where h and b are the height and width of the cross section of the section respectively. Each section is formed by a plurality of turns 12 of rectangular cross section, the turns being adjacent one another along their large surfaces, wheirein one side of each section is positioned in a first layer 13 of the two-layer winding, the opposite side—in a second layer 14. The sections are laid so that the large surfaces of the turns in the first and second layers 13, 14 of the winding 10 in each slot 9 of the tooth zone 8 are oriented mutually perpendicular, as a result of which the height of the face parts 11 does not exceed the height of the slot 9.

Assembly of the electric motor is carried out in the following manner. The sections of the winding 10 are made separately from turns of wire of rectangular cross section, wherein the dimensions of the cross section of the section are selected, taking into account the relationship h=(0.9–1.1)b, where h is the height of the cross section of the section, b is the width of the cross section of the section, which makes it possible to ensure a maximum space filling of the slot. The sections are preliminarily formed and laid into the open to the outside, towards the side of the periphery of part 6, slots 9 of the packet of sheets of the tooth zone 8. After that the packet of sheets of the annular yoke—the outer part 7, which is fixed against turning by any known method (for example by an adhesive) is put on from the outside. The prepared stator 3 with the winding 10 is arranged in the body 1. In order to ensure assembly of the inner part 6 of the tooth zone 8 with the winding 10 and the outer part 7 of the annular yoke, it is necessary that the height of the face parts 11 does not exceed the height of the slot 9. This is achieved in that the face parts 11 of the sections in the zone of transition from the layer 13 to the layer 14 are turned along the axis of the multiturn section, so that the turns of one side of each section, which form one of the two layers 13, 14 of the winding 10, are positioned parallel to the longitudinal axis of the slot 9, while the turns of the second side of each section are positioned perpendicular to that same axis. Making the winding 10 of wire having a rectangular cross section makes it possible to substantially enhance the filling factor of the slot.

Operation of the electric motor of the submersible pump is carried out in the following manner. When current is applied to the winding 10 of the stator 2, interaction of the magnetic field of the rotor 5, created either by permanent magnets or by currents in the short-circuited winding of the rotor (depending on the type of electric motor), with the currents in the winding of the stator creates a working moment and drives the output shaft of the electric motor into rotation.

The proposed construction makes it possible to reduce the weight and dimensions, including the diameter, of electric motors of submersible pumps, which makes it possible to expand the field of their utilization by servicing small diameter wells, and also to enhance the productivity of submersible electric pumps in small diameter wells.

The electric motor of a submersible pump that is made in accordance with the present invention is designed preferably for use as a drive for submersible pump units used in oil wells.

What is claimed is:

1. An electrical motor for a submersible pump, comprising:
    a body of the electrical motor;
    a stator of the electrical motor arranged inside said body and having a laminated stator core;
    a rotor of the electrical motor arranged coaxially with a gap inside said stator;
    an inner part of said stator core including a tooth zone with slots open to a side of a periphery of said inner part;
    an outer part of said stator core which is an annular yoke and encompasses said inner part of said stator core;
    a stator winding having a first winding layer, a second winding layer and a plurality of multiturn winding portions, each of said winding portions has a first side of a winding portion, a second side of a winding portion and a face part of a winding portion, wherein each of said winding portions has a substantially square cross section, while turns forming said winding portions each have a substantially rectangular cross section, a large surface of said turn and a smaller surface of said turn and are adjacent each other by said large surfaces, wherein said winding portions are arranged in said slots of said tooth zone so that said first side of said winding portion is positioned in said first winding layer, while said second side of said winding portion is positioned in said second winding layer, said large surfaces of said turns in said first winding layer in each said slot of said tooth zone are oriented substantially perpendicular to said large surfaces of said turns in said second winding layer, and a height of said face parts of said winding portions does not exceed a height of said slots.

2. An electrical motor of a submersible pump, including a body with a laminated core of a stator arranged therein, in slots of a tooth zone of which multiturn stator winding portions are disposed with face parts, and a rotor spaced from said stator by a gap, wherein the improvement is that said stator winding is made two-layer, said core of said stator comprises an inner part including said tooth zone with slots open to a side of a periphery of said inner part, and an outer part encompassing said inner part and being an annular yoke, each stator winding portion has a substantially square cross section and is formed by turns of wire of substantially rectangular cross section, said turns lying adjacent each other along large surfaces of said turns, wherein a first and second side of each winding portion are positioned in different layers thereof so that in each said slot said large surfaces of said turns in a first and a second layer of said stator winding are oriented mutually perpendicular, and a height of said face parts does not exceed a height of said slot.

3. An electrical motor of a submersible pump, comprising:
    a body of the electrical motor;
    a stator of the electrical motor arranged inside said body and having a laminated stator core;
    a tooth zone of said stator core, having slots;
    a stator winding having multiturn winding portions with face parts, wherein said winding portions are positioned in said slots of said tooth zone of said stator core;
    a rotor of the electrical motor arranged coaxially with a gap inside said stator;

wherein the improvement is that said stator core has an inner part of said stator core, said tooth zone of said stator core with slots is positioned in said inner part of said stator core, said slots are open to a side of a periphery of said inner part;

said stator core further comprises an outer part of said stator core, said outer part being an annular yoke and encompassing said inner part of said stator core;

said stator winding has a first winding layer and a second winding layer, each of said portions of said stator winding has a first side of said winding portion and a second side of said winding portion, wherein each of said winding portions has a substantially square cross section, while turns forming said winding portions have each a substantially rectangular cross section, a large surface of said turn and a smaller surface of said turns and are adjacent each other by said large surfaces, wherein said winding portions are arranged in said slots of said tooth zone so that said first side of said winding portion is positioned in the first winding layer, while the second side of said winding portion is positioned in said second winding layer, said large surfaces of said turns in said first winding layer in each said slot of said tooth zone are oriented substantially perpendicular to said large surfaces of said turns in said second winding layer, and a height of said face parts of said winding portions does not exceed a height of said slots.

* * * * *